United States Patent
Basu Mallick et al.

(10) Patent No.: US 10,536,918 B2
(45) Date of Patent: Jan. 14, 2020

(54) METHOD AND APPARATUS FOR MANAGING DUAL REGISTRATION WITH MULTIPLE NETWORKS IN ONE OR MORE RADIO COMMUNICATION SYSTEMS

(71) Applicant: Lenovo (Singapore) Pte. Ltd., New Tech Park (SG)

(72) Inventors: Prateek Basu Mallick, Langen (DE); Joachim Löhr, Wiesbaden (DE); Genadi Velev, Darmstadt (DE); Ravi Kuchibhotla, Clarendon Hills, IL (US); Alexander Golitschek Edler von Elbwart, Darmstadt (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 16/143,872

(22) Filed: Sep. 27, 2018

(65) Prior Publication Data
US 2019/0098596 A1 Mar. 28, 2019

Related U.S. Application Data

(60) Provisional application No. 62/565,031, filed on Sep. 28, 2017.

(51) Int. Cl.
*H04W 4/00* (2018.01)
*H04W 60/00* (2009.01)
(Continued)

(52) U.S. Cl.
CPC .......... *H04W 60/005* (2013.01); *H04L 45/04* (2013.01); *H04W 8/06* (2013.01);
(Continued)

(58) Field of Classification Search
USPC ......... 455/11.1, 456.1, 436, 552.1, 418, 437, 455/435.2, 435.1, 574, 543, 572
See application file for complete search history.

(56) References Cited

U.S. PATENT DOCUMENTS 10,218,422 B2 * 2/2019 Raghavan .............. G06F 1/206
2006/0172729 A1 8/2006 Kirbas
(Continued)

FOREIGN PATENT DOCUMENTS

EP 2863665 A1 4/2015
EP 3007512 A1 4/2016
(Continued)

OTHER PUBLICATIONS

3GPP TS 23.401 V15.0.0 (Jun. 2017), 3rd Generation Partnership Project, Technical Specification Group Services and System Aspects, General Packet Radio Service (GPRS) enhancements for Evolved Universal Terrestrial Radio Access Network (E-UTRAN) access (Release 15).
(Continued)

*Primary Examiner* — Joseph Arevalo
(74) *Attorney, Agent, or Firm* — Loppnow & Chapa

(57) ABSTRACT

A method and apparatus provides for managing dual registration with multiple networks in one or more radio communication systems. The one or more radio communication systems include multiple networks each supporting a different radio access technology. A communication connection is established between the user equipment and a first one of the multiple networks. A further communication connection is established between the user equipment and a second one of the multiple networks, while maintaining the communication connection between the user equipment and the first one of the multiple networks. A shared common control element in the user equipment manages the flow of information between the user equipment and each of the multiple net-
(Continued)

works via the respective communication connections, thereby allowing for parallel user equipment activity in at least the first one and the second one of the multiple networks.

19 Claims, 9 Drawing Sheets

(51) Int. Cl.
| | |
|---|---|
| H04W 8/06 | (2009.01) |
| H04W 88/06 | (2009.01) |
| H04W 76/15 | (2018.01) |
| H04W 36/00 | (2009.01) |
| H04L 12/715 | (2013.01) |
| H04W 40/02 | (2009.01) |
| H04W 80/08 | (2009.01) |

(52) U.S. Cl.
CPC ....... *H04W 36/0069* (2018.08); *H04W 40/02* (2013.01); *H04W 76/15* (2018.02); *H04W 80/08* (2013.01); *H04W 88/06* (2013.01)

(56) References Cited

U.S. PATENT DOCUMENTS

| | | | |
|---|---|---|---|
| 2012/0100843 A1 | 4/2012 | Wu et al. | |
| 2013/0044709 A1 | 2/2013 | Adjakple et al. | |
| 2014/0153489 A1* | 6/2014 | Perras | H04W 60/00 370/328 |
| 2015/0065106 A1* | 3/2015 | Catovic | H04W 8/22 455/418 |
| 2018/0020418 A1* | 1/2018 | Chandramouli | H04W 60/005 |
| 2018/0146398 A1* | 5/2018 | Kim | H04W 72/0406 |
| 2018/0184246 A1* | 6/2018 | Ryu | H04W 8/02 |
| 2019/0021064 A1* | 1/2019 | Ryu | H04W 76/27 |
| 2019/0029065 A1* | 1/2019 | Park | H04W 60/06 |
| 2019/0053175 A1 | 2/2019 | Kubota et al. | |
| 2019/0053306 A1* | 2/2019 | Cho | H04W 8/08 |
| 2019/0098597 A1* | 3/2019 | Basu Mallick | H04W 60/005 |
| 2019/0124563 A1* | 4/2019 | Zhang | H04B 7/14 |

FOREIGN PATENT DOCUMENTS

| | | |
|---|---|---|
| WO | 2013152483 A1 | 10/2013 |
| WO | 2016126238 A1 | 8/2016 |
| WO | 2017087232 A1 | 5/2017 |

OTHER PUBLICATIONS

3GPP TS 24.301 V15.0.0 (Sep. 2017), 3rd Generation Partnership Project, Technical Specification Group Core Network and Terminals, Non-Access-Stratum (NAS) protocol for Evolved Packet System (EPS), Stage 3 (Release 15).

3GPP TS 25.301 V14.0.0 (Mar. 2017), 3rd Generation Partnership Project, Technical Specification Group Radio Access Network, Radio Interface Protocol Architecture (Release 14).

3GPP TS 36.300 V14.0.0 (Sep. 2016), 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2 (Release 14).

3GPP TS 36.304 V14.3.0 (Jun. 2017), 3rd Generation Partnership Project, Technical Specification Group Radio Access Network, Evolved Universal Terrestrial Radio Access (E-UTRA), User Equipment (UE) procedures in idle mode (Release 14).

3GPP TS 36.331 V14.3.0 (Jun. 2017), 3rd Generation Partnership Project, Technical Specification Group Radio Access Network, Evolved Universal Terrestrial Radio Access (E-UTRA), Radio Resource Control (RRC), Protocol Specification (Release 14).

3GPP TS 38.304 V0.0.4 (Aug. 2017), 3rd Generation Partnership Project, Technical Specification Group Radio Access Network, New Generation Radio Access Network, User Equipment (UE) procedures in Idle mode (Release 15).

3GPP TS 38.331 V0.0.5 (Aug. 2017), 3rd Generation Partnership Project, Technical Specification Group Radio Access Network, NR, Radio Resource Control (RRC), Protocol Specification (Release 15).

Vu, Notice of References Cited, PTO-892, U.S. Appl. No. 16/143,937, U.S. Patent and Trademark Office, Mar. 14, 2019.

PCT International Search Report for PCT/IB2018/001184, Lenovo (Singapore) Pte. Ltd., dated May 13, 2019, citing references originally identified in an Annex to an Invitation to Pay Additional Search Fees dated Mar. 20, 2019.

PCT International Search Report for PCT/IB2018/001192, Lenovo (Singapore) Pte. Ltd., dated Mar. 20, 2019.

NTT DOCOMO, "Interworking between NGC and EPC", S2-170934, Interworking Principles V2, 3rd Generation Partnership Project (3GPP) Sophia-Antipolis Cedex, France, Feb. 7, 2017.

* cited by examiner

METHOD AND APPARATUS FOR MANAGING DUAL REGISTRATION WITH MULTIPLE NETWORKS IN ONE OR MORE RADIO COMMUNICATION SYSTEMS

FIELD OF THE INVENTION

The present disclosure is directed to a method and apparatus for managing dual registration in one or more radio communication systems, which include multiple networks, and more specifically for the managing of parallel user equipment activity relative to established communication connections between the user equipment and the multiple networks, where each network supports a different radio access technology.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

The manner in which information is handled and/or the types of entities within the network available for handling the information can be different in each type of network. Correspondingly, there may be instances where a type of service or an application associated with a particular wireless communication device will be better suited to a particular one of multiple different network environments. Which network is better suited may be different for different services or application. As such, there may be instances where it may be desirable for a wireless communication device to maintain an active association with multiple networks, which can at least sometimes be referred to as dual registration.

The present inventors have recognized, that in instances where dual registration is utilized, it may be helpful for the multiple communication connections that are established with the multiple networks and the flow of information therethrough to be managed through a shared common control element, which can facilitate parallel user equipment activity in at least a first one and a second one of the multiple networks, as well as the corresponding routing of the information to be communicated as part of the parallel activity.

SUMMARY

Presently, user equipment, such as wireless communication devices, communicate with other communication devices using wireless signals. According to a possible embodiment, a method in a user equipment for managing dual registration in one or more radio communication systems is provided. The one or more radio communication systems include multiple networks each supporting a different radio access technology. The method includes establishing a communication connection between the user equipment and a first one of the multiple networks. The method further includes establishing a communication connection between the user equipment and a second one of the multiple networks, while maintaining the communication connection between the user equipment and the first one of the multiple networks. A shared common control element in the user equipment manages the flow of information between the user equipment and each of the multiple networks via the respective communication connections, thereby allowing for parallel user equipment activity in at least the first one and the second one of the multiple networks.

According to a possible embodiment, a user equipment for managing dual registration in one or more radio communication systems is provided, where the one or more radio communication systems including multiple networks each supporting a different radio access technology. The user equipment includes a transceiver that establishes a communication connection between the user equipment and a first one of the multiple networks, and establishes a communication connection between the user equipment and a second one of the multiple networks, while maintaining the communication connection between the user equipment and the first one of the multiple networks. The user equipment further includes a controller, which has a shared common control element that manages the flow of information between the user equipment and each of the multiple networks via the respective communication connections, thereby allowing for parallel user equipment activity in at least the first one and the second one of the multiple networks.

According to a possible embodiment, a method in a network entity of a first one of multiple networks is provided. Each network supports a different radio access technology. The method includes establishing a communication connection between the network entity and the user equipment, while the user equipment has established and is maintaining an alternative communication connection with another network entity associated with a second one of the multiple networks. The method further includes receiving flow management information from a shared common control element of the user equipment, which manages the parallel user equipment activity including a flow of information between the user equipment and each of the multiple networks via the respective communication connections. The method still further includes communicating with the user equipment in a manner which is consistent with the flow management information that is received from the shared common control element.

According to a possible embodiment, a network entity is provided. The network entity includes a transceiver that establishes a communication connection between the network entity and the user equipment, while the user equipment has established and is maintaining an alternative communication connection with another network entity associated with a second one of the multiple networks, where the multiple networks each support a different radio access technology, The transceiver further receives flow management information from a shared common control element of the user equipment, which manages the parallel user equipment activity including a flow of information between the user equipment and each of the multiple networks via the respective communication connections. The network entity further includes a controller that manages the flow of information that is communicated between the network entity and the user equipment via the transceiver of the network entity in a manner consistent with the flow management information that was received from the shared common control element of the user equipment.

These and other objects, features, and advantages of the present application are evident from the following description of one or more preferred embodiments, with reference to the accompanying drawings.

DETAILED DESCRIPTION OF THE PREFERRED EMBODIMENT(S)

Figure 1:
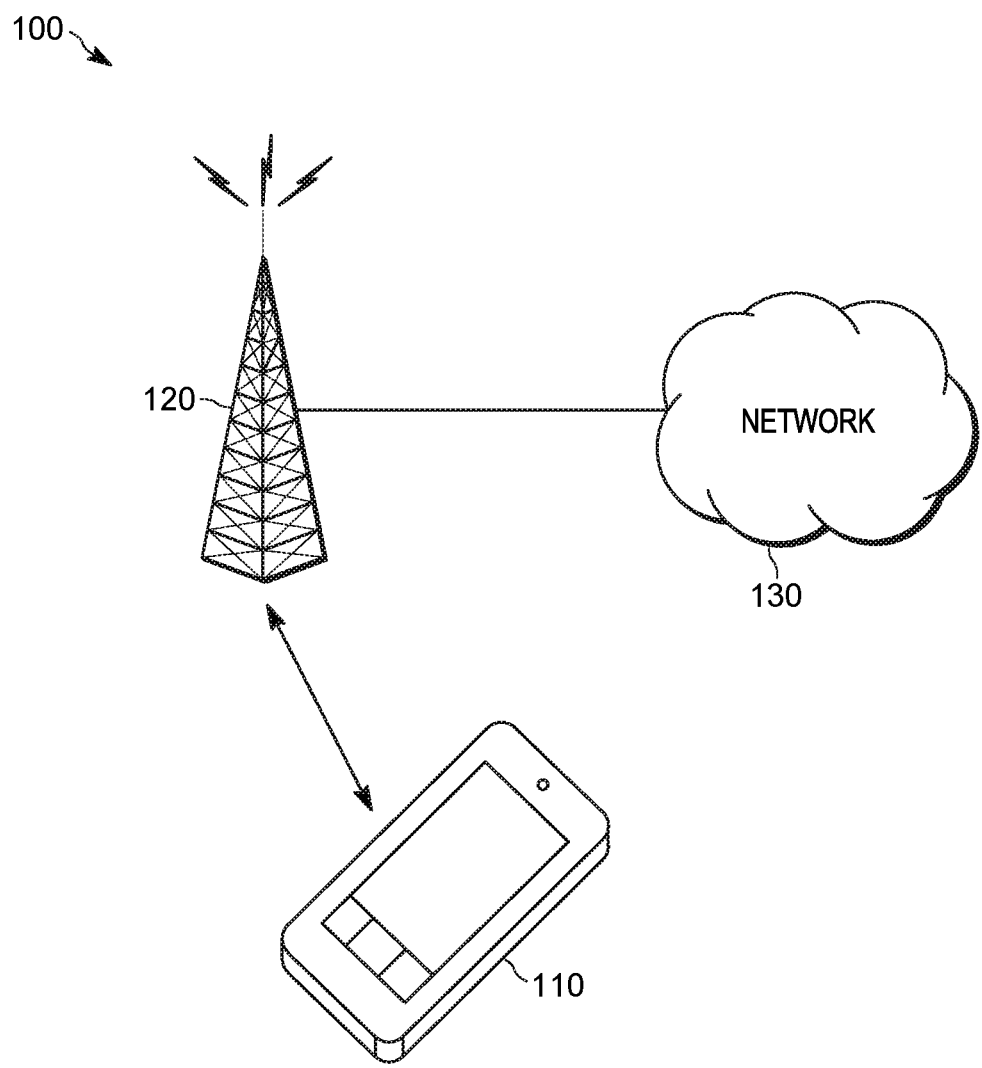
FIG. 1 is an overview of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for managing dual registration in a radio communication system.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

A UE may benefit from availing itself of certain services better supported using the 5G System (e.g. NR/5GC) and certain other services better supported using the LTE Evolved Universal Terrestrial Access Network (E-UTRAN)/Evolved Packet Core (EPC) system. To be able to simultaneously use these services, each supported in a different system, is generally not readily supported today if both radios are 3GPP-specified radio access technologies.

3GPP intends to support a mechanism allowing dual registration meaning that the UE can register simultaneously in evolved packet system (EPS) and 5G system (5GS) as described e.g. in 3GPP TS 25301-v140 clause 5.17.2.3. However, just dual registration itself may not allow parallel UE activity in both systems. The parallel UE activity in both systems allows the UE to receive and to respond to Paging and perform mobility Registration/tracking area update (TAU) in each radio access technology (RAT) and possibly also actively use the packet data network (PDN) Connection and protocol data unit (PDU) Sessions established and activated on the two Systems.

There are dual-radio solution e.g. for the combination of the following radio access technologies (RATs): (1) for wireless local area network (WLAN) and 3GPP RAT and (2) for E-UTRA/LTE and code division multiple access (CDMA) 2000. However those mechanisms cannot be applied to 3GPP-specific dual-radio RATs.

The existing solution may only rely on UE specific implementations. UE specific implementations may not work however in the absence of a specified solution specifying how the UE needs to 'manage' both RATs and be active with single/dual receive (Rx)-transmit (Tx) capabilities. For example, it is not clear how a single Rx/Tx chain capable UE shall receive and respond to paging in two different systems without a potential performance degradation in its active session in one of the systems where it is in a radio resource control (RRC) Connected state. Similarly, it is not clear how a dual Rx/Tx chain capable UE shall split its maximum UE transmit power to be able to support transmissions in both of the systems, simultaneously, when the need arrives.

In the following description a "system" is defined as the whole network including the Radio Access Network (RAN) based on 4th (E-UTRAN) or 5th (New RAT, NR) generation technologies and Core Network (EPC and 5GS respectively for the 4th and 5th generation).

A UE can Register (also called Attach) itself to one of the systems first. An RRC Idle state UE does this by first establishing an RRC Connection and then sends a non-access stratum (NAS) Registration request message to a core network (CN) node. The relevant CN Node is a mobility management entity (MME) and an access management function (AMF) for the EPC and 5GS respectively. The relevant CN Node may accept the UE's registration request (Attach Request) depending on the credentials (like subscription information present on the universal subscriber identity module (USIM)) provided by the UE. After having attached to the System, the UE may initiate an establishment of some PDN Connection (in $4^{th}$ generation) or PDU Session (in 5th generation) towards the relevant core network. Subsequent to the establishment of PDN Connection or PDU Session the same maybe activated by establishing some DRBs (Data Radio Bearer) on the radio interface.

In one embodiment, the decision at the upper layers (e.g. NAS layer) works in the following way: A common NAS part (or one can call it upper NAS) decides if either or both NAS (LTE NAS and/or 5G NAS) need to be "used". The said Upper or common NAS is a logical entity and could be part of the access network discovery and selection function (ANDSF) or the policy control function (PCF) in 5GS. This decision by the common NAS part is based on services required and/or supported by the UE, UE dual registration and also radio capabilities, Network capability etc. Common NAS sits above both the NAS entities and works like an Upper NAS protocol. Access stratum supports the common/ upper NAS by informing it as to what is supported/broadcasted by the network i.e. about network capabilities like support of Dual Registration and service/Slice/application supported in the Radio and in the Core Network(s). Whether (1) to initiate Dual Registration and (2) whether to simultaneously use some connections to one system and other connection to the other system (e.g. having simultaneous PDU Sessions to 5GS and PDN Connections to EPS) may depend on the following criteria: (A) access stratum (AS) capabilities in the UE (single/dual radio, enhancements for using multiple RATs), (B) capabilities in the RAN (e.g. support of enhancements for using multiple RATs as specified in this invention) and/or (C) capabilities in the core network (CN) to support dual registration (DR) mode and/or steering of connections among multiple systems. Several examples are listed below:

(1) If the core network indicates to the UE that DR-mode is not supported, then the UE does not initiate procedures for dual registration, even though the UE may be capable of DR-mode and at least some of the solutions below are supported.

(2) If the core network indicates support of DR-mode, but the RAN (node) indicates non-support of enhancements for using multiple RATs (e.g. some features as disclosed in this invention), the UE may decide to perform DR but keeping all connections (PDU Sessions or PDN Connections) in a single system.

(3) If the AS layer indicates to the NAS layer (a) single-radio capable (e.g. single Rx/Tx chain) and (b) support of enhancements for using multiple RATs; and both RAN and CN support such enhancements for using multiple RATs—then the NAS layer can determine whether to perform DR and simultaneous use of PDU Sessions and PDN Connections based on configuration or subscription policies (e.g. as configured from Policy Control Function, PCF, to the UE).

The eNB/gNB may broadcast relevant network capabilities in this regard. This can be done using a combined indication (combining capabilities of both RAN and CN) or individual capabilities could be separately broadcasted. The network capabilities could even be indicated on a per public land mobile network (PLMN) basis, in case of RAN sharing.

The UE may further proceed to register itself on the second/other System next. As an example, in LTE/EPC the registration at the serving GPRS support node (SGSN)/ mobile switching center (MSC) was done by the MME on behalf of the UE for Combined Attached UEs. The Attach Accept message from MME contains both 4th generation globally unique temporary identification (4G GUTI) and 3rd generation globally unique temporary identification (3G GUTI) or visitor location register (VLR) temporary mobile subscriber identity (TMSI). In 5GS a UE in Dual Registration (DR-mode) performs the registration at the AMF and the registration at the MME by itself, i.e. UE-initiated registration. This DR-mode can be performed even if the UE is single Rx/Tx capable; for example, after registering on the first system the UE initiates registration on the second system when it has transitioned to the RRC Idle mode of the first system.

As one embodiment, this can be done in a number of ways. The UE may indicate to the network RAN node that it is dual registration capable at some point in time during or after the RRC Connection Establishment. Later, when the UE actually needs to register on the other system, it will request the RAN Node to release the RRC Connection. The network upon receiving the UE's request may reject the UE's request and UE shall then remain in RRC Connected state as long as the network does not release the RRC Connection. In another possible variant, the UE may autonomously start transitioning to RRC Idle after having sent to the RAN Node an indication indicating that the UE is subsequently transitioning to RRC Idle. In yet another possible variant, the UE may autonomously start transitioning to RRC Idle without having sent to the RAN Node an indication indicating that the UE is subsequently transitioning to RRC Idle; in which case, the network upon noticing no uplink (UL) activity from the UE until a certain time duration will assume that the UE is no longer available i.e. has either met an RLF (Radio Link failure) condition and is therefore out of service, or, has transitioned to RRC Idle autonomously. In yet another possible variant, the UE will request the RAN Node to transition the UE to RRC Inactive state rather than releasing the RRC Connection itself. A UE in RRC Inactive state would save the AS configuration/ context until it returns in the RRC Connected state of the said RAT. In the RRC Inactive state, this UE may tune away to another System and perform registration there. After having performed the registration, as soon as possible, the UE shall return to the said source RAT/System.

Where the present application refers to an idle state or an inactive state, the teachings of the present application could generally correspond to either of the noted idle or inactive states, or both of the possible states.

If the UE is single Rx/Tx capable, the UE would miss the Paging in one of the system and also not be able to perform mobility Registration/TAU in the RAT where it is away i.e. not tuned in currently. Following are the possible enhancements that may be consistent with and/or realizable from the teachings of the present disclosure:

As one embodiment, the UE would determine one or more Gap or Away Pattern where it is not available in System 1 but is rather tuning to the frequency of System 2 to be able to perform reception and transmission there. The Away pattern(s) is then signaled to one of the RATs (like to eNB or gNB) where the UE is in an RRC Connected State. The RAN node (like to eNB or gNB) may then attempt to avoid scheduling of the UE during the time periods indicated by the Away Pattern suggested by the UE. The determination of the Away Pattern(s), suggested by the UE to the RAN Node, might itself account for the frequency retuning time. The RAN Node will also discount the periodic transmissions like physical uplink control channel (PUCCH) or periodic buffer status report (BSR) reporting from the UE if they happen to collide with the Away Pattern. Any transmission counter towards such UL transmission may not be incremented. Alternatively, as an improvement of the embodiment, some particular transmission like Scheduling Requests or particular activation/deactivation MAC control elements (CEs)

may be prioritized over the Away Pattern and the UE may be tuned in on the frequency of the RAT where the UE is currently RRC Connected.

Figure 2:
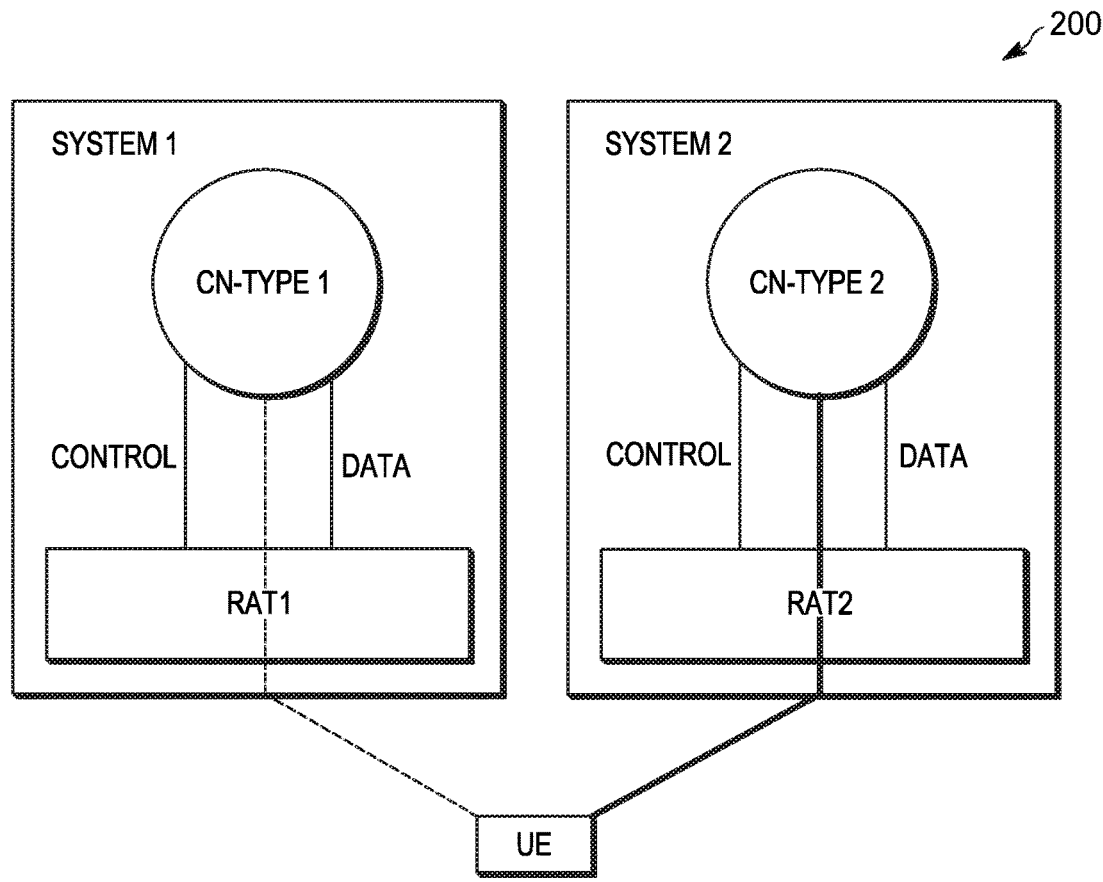
FIG. 2 is a block diagram of an example of one possible form of coupling of the user equipment relative to multiple networks.

FIG. 2 illustrates a block diagram of an example of one possible form of coupling of the user equipment relative to multiple networks. More specifically, FIG. 2 highlights a user equipment (UE) radio resource control (RRC) coupled to a second system (System 2), which from time to time can additionally and/or alternatively be tuned to a first system (System 1). Such an arrangement is well suited to the use of a common control element, which can be used to manage the flow of information between the user equipment and each of multiple networks via respective communication connections.

One or more Away Patterns can be determined by the UE based on different time offset (say from system frame number zero (SFN #0), subframe #0), different Paging occasions, random access channel (RACH) opportunities etc. which may still fulfill the UE's requirement of reception and/or transmission on the other RAT. In addition, there could be a minimum Away Pattern signaled which gives the network an indication on how periodically the UE needs to be away. The away pattern(s) may be determined based on how frequently the UE needs to be active on the RAT1. The away pattern(s) may be re-determined from time to time when the UE's situation changes e.g. when the activity in the other RAT has changed or the UE moves to a different frequency/Bank in either of the RATs etc. If a single Rx capable UE tunes to RAT1 only to listen to Paging then the Away pattern(s) will be one subframe (or time period) every Paging Occasion that the UE has for that system. The Paging occasion calculation is specified in 3GPP TS 36304-e30 or in future also in TS 38304. If the UE received a Paging message and needs to respond then after tuning back in RAT2, the UE may need to convey another Away pattern that allows the UE to send the Paging Response message in RAT1 i.e. allows it to perform RACH Msg1, 2, 3 and 4 transmission as defined in 3GPP TS 36300-e00, transmission of NAS (Paging Response) message etc. If however, it is clear that the UE needs to stay longer in the RAT1 e.g. to receive downlink (DL) data/transmit UL data, then the UE may suggest RAT1 another Away Pattern enabling the UE to continue its activity in RAT2. The UE may also inform the RAN node 1 during an RRC Connection Establishment about any Dual Registration situation with the "other" RAT so that the RAN node 1 may expedite this UE's procedure and DL/UL data transfer. Of course, when the UE shares the Away Pattern with any RAT, the RAN Node may accept, modify (by changing the time period availability) or reject completely the UE's suggested away pattern. In case of rejection, the UE may not be able to tune away from the rejecting RAT. To be able to determine the Away Pattern, the UE needs to first autonomously tune in to RAT1 e.g. using discontinuous reception (DRX) sleep time and then synchronize to the RAN1 DL timeline. In doing so, the UE shall strive not to lose the synchronization with the source RAT e.g. by devoting one internal time clock to it or by similar means. The UE shall use the DL time difference of the source and the target RAT to determine the Away Pattern such that the Paging occasion in RAT2 coincides with the Away pattern indicated to RAT1 using RAT1's timeline.

In another embodiment, the UE may not be able to use an Away pattern but rather may stay on its current System. In doing so, the UE may be unable to perform registrations (mobility based and/or periodic) in the other System. A dual Rx UE may still be able to receive the Paging message itself by tuning/using one of its Rx Chain to the frequency of the other RAT; however, in absence of a dual transmitter, it may not be able to send a Paging Response message without tuning away from the current System. This embodiment makes it then possible to make the required transmission (Paging Response and/or Registration) later when the UE transitions to RRC Idle in the current RAT (of the current System) by reselecting to a cell of the other RAT (of the other System) and later initiating an RRC Connection Establishment there. Since this might typically delay the UE's UL transmission in the other System, the UE Access Stratum shall inform the UE NAS of its inability and ability to perform the UL transmissions in the other System. The NAS shall save the pending NAS message and shall request the UE Access Stratum to go ahead with the transmission to the UE Access Stratum indicating the ability to perform the UL transmission. This may however generally only be done until a certain timer has expired, beyond which the UE may consider itself deregistered AND will then go ahead with a new/fresh registration with the other System. The timer itself may be UE implementation dependent or may be configurable by the network.

In a further embodiment, a dual Rx/Tx capable UE may tune itself to the frequency of both of the Systems using the two available Rx/Tx chains. UE's total allowed transmission power $P_{cmax}$ may need to be coordinated/split between the two RATs. According to one embodiment the UE could be configured by the network with a maximum transmission power for each RAT, i.e. $P_{RAT1}$ and $P_{RAT2}$. Power control is then further done independently for each RAT. $P_{RAT1}+P_{RAT2}$ may be smaller or equal to total UE transmit power, e.g. $P_{cmax}$. Some additional power backoff may be applied for determining the total UE maximum allowed TX power, e.g. $P_{cmax}$, for cases in which the UE is transmitting simultaneously on two RATs. Such power restriction may be necessary from a regulation perspective in order to meet SAR (Specific Absorption Rate) requirements or out-of band emission requirements that may be affected by inter-modulation products of the simultaneous radio transmissions. In an alternative embodiment the UE may decide the power split between the two RATs. In other words, the UE may set the maximum transmission power for each RAT such that total UE transmission power is not exceeded. UE may report the decided maximum transmission power for each RAT to the corresponding network node. This allows an efficient scheduling of uplink transmission within each RAT. In an alternative embodiment the uplink transmission power is dynamically shared between the two different RATs. However, the required power levels for each transmission may exceed the allowed total UE transmitted power when a transmission in both Systems needs to be made. Uplink and downlink transmission are scheduled independently in each RAT. Thus, for example, the UE may have two simultaneous uplink transmission scheduled, one by RAT1, the other by RAT2, without one network entity/scheduling entity being aware of the scheduling information of the other network node/scheduling entity. Scheduling of PUCCH/PUSCH/PRACH/SRS of one link is not known to the network entity of another link. According to one embodiment the UE may prioritize uplink transmissions on one RAT over uplink transmission on the other RAT in cases where the maximum total UE transmission power is exceeded. In some implementations the UE first determines the transmission power for each RAT separately assuming that the other link on the other RAT does not exist. Then the UE uses the determined transmission power for the prioritized RAT for uplink transmissions on the prioritized RAT and uses the remaining power for the uplink transmission on the other RAT. In cases where the determined transmission power for the other non-prioritized RAT exceeds the remaining power, the UE could perform power scaling for the non-prioritized RAT. In another embodiment the priority of UL transmissions/channel(s) between the two RATs is considered in the dynamic power sharing. For example in certain embodiments transmissions of RRC messages, e.g. paging response message, higher reliability and delay intolerant applications' data should be prioritized over other uplink transmission channels/signals such that the transmission power for the RRC messages is not scaled. The UE may apportion its capabilities among the two RATs based on one or more factors, such as data rate, data volume, reliability, urgency etc. The apportioned capabilities could include the physical layer and upper layer capabilities like Antenna Ports, layer one/two transmission/reception buffers, Band combinations supported, transmitted power etc. The apportioned capabilities towards each RAT can be indicated to the corresponding RATs when the UE transitions to an RRC Connected State and/or as part of a UE's ATTACH Request. To help indicate early a lower or scaled down capabilities like Tx power, some reserved Preamble or time-frequency resources for PRACH transmissions can be used so that the receiving RAN Node could be made aware of this and schedule the RACH Msg3 transmissions e.g. with lower frequency grant and/or with more conservative MCS by providing a corresponding grant in RACH message 2 (i.e. in Random Access Response).

When transmissions to both of the RATs need to take place such that at least part of the transmission to the RATs can overlap then (1) the power management related procedure may be performed in the Physical layer such that the Physical layer based on the destination RAT or Radio frequency carrier applies power scaling and/or backoff while making transmission. In cases, when the power is insufficient for at least one of the links and the decision for power scaling needs to be made based on the "content" of the transmission, the Physical layer will query higher layers (2) or, in cases, when the decision about prioritization including go/no-go decision based on the "contents of the transport block" needs to be made, then a UE entity sitting above or at MAC needs to decide if the transmission intended for one of the RATs is more important i.e. has higher priority than the transmission intended for the other RAT. This prioritization may affect only the power management, or the prioritization may also be used in making a go/no-go or a pre-emption decision in favor of transmission to one RAT.

The information about prioritization may be configured by the network explicitly, such as using a Logical Channel Prioritization (LCP value) or a similar new IE can be used or the UE itself may judge which transmissions are more important for it. For example, RRC signaling may be more important than any data. Data from certain application may be more important than data from other applications etc. The prioritization can also be based on the quality of service class identifier—QCI/QOS range.

A UE that needs to maintain two active sessions (PDN Connections and PDU Sessions) with the two Systems in parallel for data transfer, shall need to establish and maintain two RRC Connections so that the NAS Connections can also be maintained. NAS Connections (like S1-C and S1-U in 4$^{th}$ generation network and N2, N3 in 5$^{th}$ generation network) allow the UE to maintain control and data connection with the respective core network elements. However, every dual Rx/Tx capable UE may not be able to establish and maintain two RRC/NAS Connections. The UE that are capable of this may indicate their capability to the UE NAS, itself, and to the network. Based on this capability, the UE may decide to establish and maintain PDN Connections and PDU Sessions in parallel. Network may control and coordinate UEs transmission, including power sharing or Away pattern sharing as described earlier, in the two Systems based on this capability indication. The capability can be indicated to the network in one or more of the following messages and corresponding procedures e.g. as defined in 3GPP TS 36331-e30, 23401, 24301, 38331 etc.:

(1) RRC Connection Establishment or any subsequent RRC message
(2) In ATTACH Request message and/or in the RRC message carrying NAS message like ULInformationTransfer
(3) In Location Registration messages like TAU (Tracking Area Update) etc.

Figure 3:
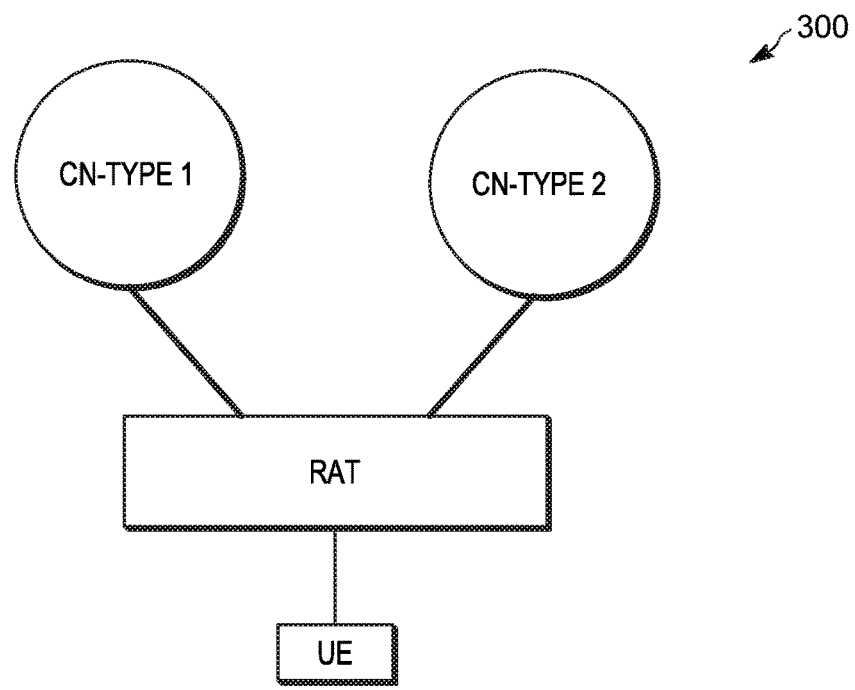
FIG. 3 is a block diagram of an example of a further possible form of coupling of the user equipment relative to multiple networks.

FIG. 3 illustrates a block diagram of an example of a further possible form of coupling of the user equipment relative to multiple networks. More specifically, FIG. 3 highlights the user equipment (UE) registering to two core networks (CNs) from the same radio access technology (RAT), such as via an associated evolved NodeB (eNB).

Figure 4:
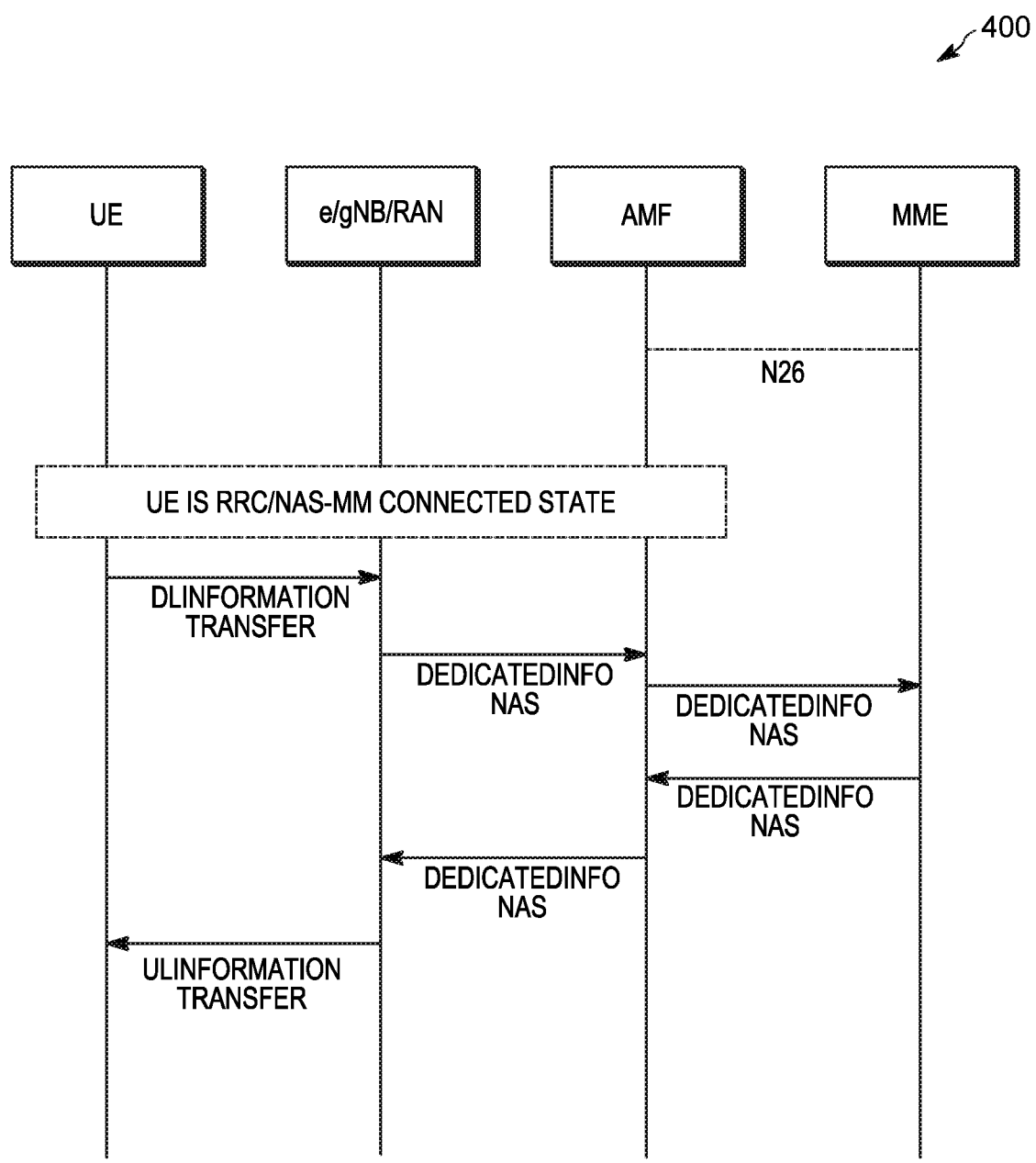
FIG. 4 is a message sequence diagram between a user equipment and a network for managing dual registration with multiple networks.

In another embodiment, such as an embodiment shown in the FIG. 3, the UE connects to a RAT (e.g. an enhanced eNB) capable of connecting to both a fourth (4th) and a fifth (5th) generation CNs. A UE in RRC Connected may then get dual registered in two possible ways:

Accomplishing this with one CN Connection:

Accomplishing this with one CN Connection wherein eNB forwards the NAS PDU (e.g. ATTACH request for the second CN) on the existing CN interface e.g. N2 and then the first CN Node like AMF determines that the NAS message is for MME e.g. based on certain information, as described further, included by the UE (in separate IEs) in the NAS PDU sent to the AMF. The AMF forwards the NAS PDU (transparently) to the MME. The MME sends back the reply (e.g. ATTACH Accept) to the UE using the same route (via the same AMF) as shown in FIG. 4. Later on the MME may initiate S1 establishment with the eNB and if some EPS Bearer(s) need to be established then the eNB may configure DRB(s) to the UE. The UE shall configure and maintain DRBs for both Systems in parallel and in one option will use the security keys and algorithm of the first System (fifth generation or 5G in this example) to secure communication on the radio interface. In another option the RAN may initiate the Security Mode procedure (send Security Mode Command to the UE) and change the UE's security algorithm and keys according to the UE capability for the second System (4G in this example). In either case, the NAS security will be based on the NAS SMS procedure from the corresponding NAS entities (like MME or AMF) for their corresponding NAS messages and procedures.

FIG. 4 illustrates a message sequence diagram between a user equipment and a network for managing dual registration with multiple networks. More specifically, FIG. 4 highlights an example of non-access stratum (NAS) message exchanges between the user equipment (UE) and the core network (CN) type 2 via the core network type 1, represented by an access management function (AMF) in this figure.

Here the DedicatedInfoNAS may contain information indicating to the first CN Type (AMF in above example) that the NAS PDU is destined to the second CN Type (MME in above example). The indication for MME could be an MME identity if the UE is already registered e.g.:

```
RegisteredMME ::=     SEQUENCE {
    plmn-Identity     PLMN-Identity    OPTIONAL,
    mmegi             BIT STRING (SIZE (16)),
    mmec              MMEC
}
```

Or, the indication for AMF could be just a Boolean flag indicating that it (the NAS PDU) is destined for the other CN Type NAS entity (MME in the above example). The example so far was such that the first CN Type NAS entity is AMF and the second CN Type NAS entity is MME; if however, if the first CN Type NAS entity is MME and the second CN Type NAS entity is AMF, then the UE could include one (or more) of the following, if the UE is registered in 5G CN:

```
registeredAMF       RegisteredAMF                          OPTIONAL,
guami-Type          ENUMERATED {native, mapped}  OPTIONAL,
ng-5G-S-TMSI-Value  CHOICE {
    ng-5g-s-tmsi        NG-5G-S-TMSI,
    ng-5g-s-tmsi-part2  BIT STRING (SIZE (9))  }
```

Or, the indication for MME could be just a Boolean flag indicating that it (the NAS PDU) is destined for the other CN Type NAS entity (AMF).

Figure 5:
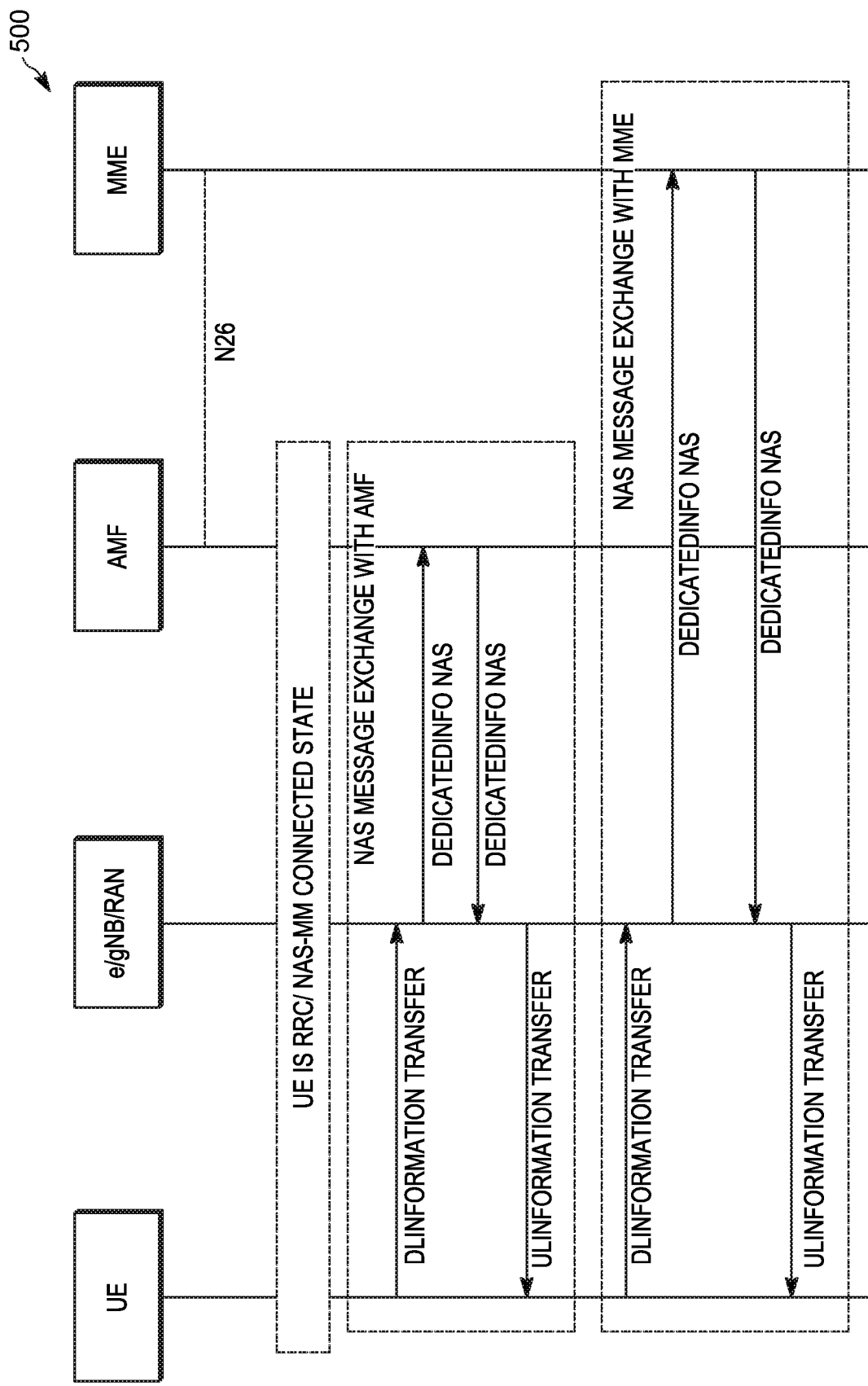
FIG. 5 is a message sequence diagram between a user equipment and multiple networks for managing dual registration.

FIG. 5 illustrates a message sequence diagram between a user equipment and multiple networks for managing dual registration. More specifically, FIG. 5 highlights a user equipment (UE) communicating with both non-access stratum core network (CN) types.

Accomplishing this with two CN connections:
  While establishing the RRC Connection the UE must indicate to the RAN node which CN it is intending to connect to. For this purpose, the UE can include one of registeredAMF or registeredAMF in the RRC Connection Setup Complete to the RAN node. The RAN node establishes accordingly the NAS connection i.e. N2 or S1 respectively. In the future, the UE may also need to communicate with the second CN type and for this reason the NAS PDU may be included and the eNB may need to identify which CN node (MME or AMF) that a particular NAS message should be forwarded to. This can be done in the following way:

In one embodiment, eNB selects the CN Connection (S1-C or N2) based on indication from the UE. As one possibility, both CN Connections are 'active' and an indication from the UE (per NAS PDU contained in e.g. SRB2) could be per NAS PDU. This indication could be either the address of MME or AMF as shown below:

```
ULInformationTransfer message
-- ASN1START
ULInformationTransfer ::=    SEQUENCE {
    criticalExtensions           CHOICE {
        c1                           CHOICE {
            ulInformationTransfer        ULInformationTransfer-IEs,
            spare3 NULL, spare2 NULL, spare1 NULL
        },
        criticalExtensionsFuture     SEQUENCE { }
    }
}
ULInformationTransfer-IEs ::= SEQUENCE {
    dedicatedInfoNAS             DedicatedInfoNAS   OPTIONAL,
    CN_Type ::=                  CHOICE {
        amf                          AMF-Address,
        mme                          MME-Address
    }
    lateNonCriticalExtension     OCTET STRING       OPTIONAL,
    nonCriticalExtension         SEQUENCE { }       OPTIONAL
}
```

Alternatively, in the above structure instead of or in addition to AMF-Address or MME-Address the corresponding UE CN identity like globally unique AMF ID (guami) or S-temporary mobile subscriber identity (S-TMSI) could be carried.

Or, could be a Boolean where TRUE means CN1 and FALSE means CN2 when both the S1 and N2 links are already established.

```
ULInformationTransfer message
-- ASN1START
ULInformationTransfer :: =   SEQUENCE {
    criticalExtensions           CHOICE {
        c1                           CHOICE {
            ulInformationTransfer        ULInformationTransfer-IEs,
            spare3 NULL, spare2 NULL, spare1 NULL
        },
        criticalExtensionsFuture     SEQUENCE { }
    }
}
ULInformationTransfer-IEs ::= SEQUENCE {
    dedicatedInfoNAS             DedicatedInfoNAS      OPTIONAL,
    CN_Type                      ENUMERATED {AMF, MME} OPTIONAL,
    lateNonCriticalExtension     OCTET STRING          OPTIONAL,
    nonCriticalExtension         SEQUENCE { }          OPTIONAL
}
```

In one embodiment, where only one CN Connections may be 'active' at any point: An RRC message could be used to activate one of the CN Connection (like either S1 or N2) and this CN Connection could be used until the UE activates the other CN link. In another variation, the UE NAS or the network side NAS could trigger the NAS messages to start and stop a NAS session with that CN Type. The RAN may also be informed and therefore at any point of time, the RAN should know which NAS session is active and will route the NAS PDUs both in UL and DL, accordingly.

Either or both CN may initiate data transmission by establishing and activating PDN Connection/PDU Session for a UE. The eNB may initiate DRB(s) to serve the corresponding PDN Connection/PDU Session. The UE may configure and maintain DRBs for both System in parallel and will use the security keys and algorithm of the first System (5G in this example) to secure communication on the radio interface. The NAS security will be based on the NAS SMS procedure from the corresponding NAS entities (like MME or AMF) for their corresponding NAS messages and procedures.

Deep Packet Inspection

In one embodiment, the RAN node looks inside of the NAS PDU and based on the content of the PDU e.g. CN Type address, UE address or protocol message etc. will itself decide to which CN Type the NAS PDU is addressed to and forward the packet to the same. However, until both S1 and N2 links are established, the UE should continue to include CN Type information explicitly in an RRC message (containing NAS PDU) to assist the RAN node in routing the NAS PDU to the correct CN Type element, such as to the MME or to the AMF.

Figure 6:
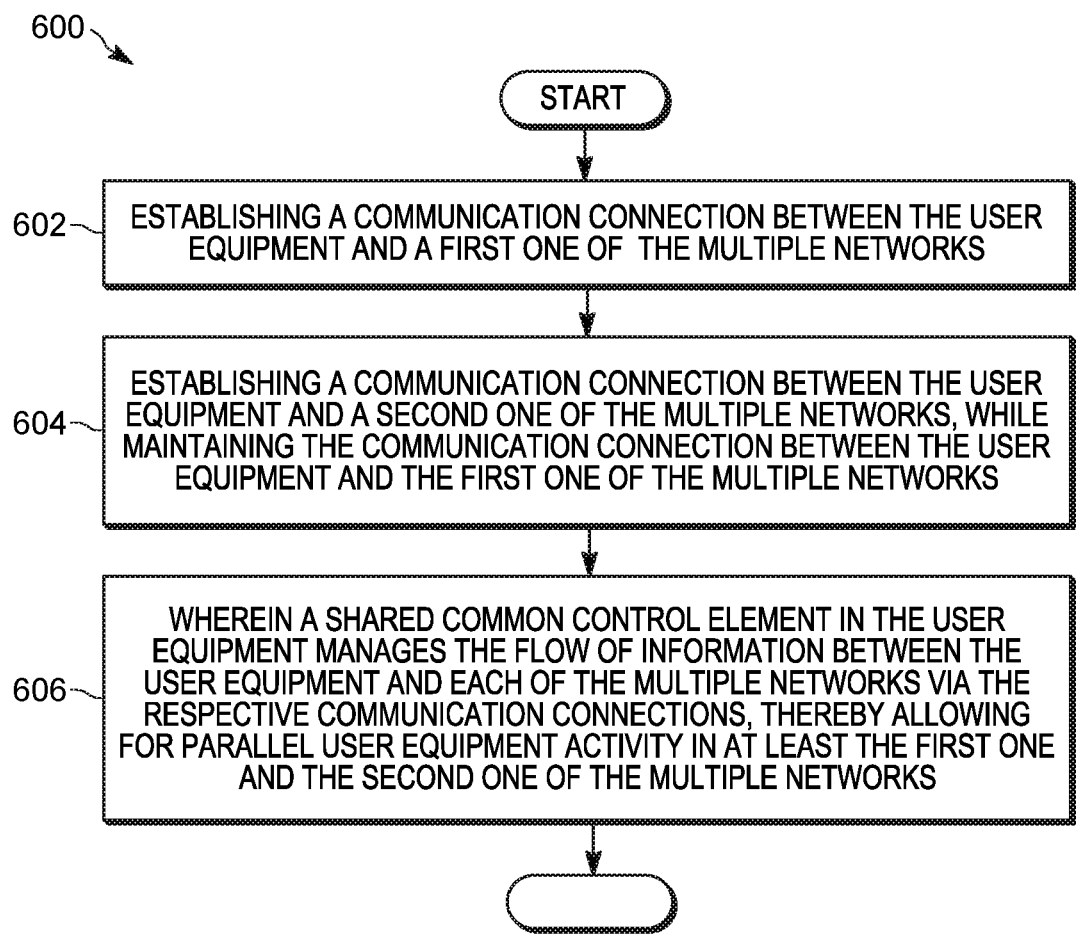
FIG. 6 is a flow diagram of a method in a user equipment for managing dual registration with multiple networks.

FIG. 6 illustrates a flow diagram 600 of a method in a user equipment for managing dual registration with multiple networks. More specifically, a method in a user equipment for managing dual registration in one or more radio communication systems is provided. The one or more radio communication systems include multiple networks each supporting a different radio access technology. The method includes establishing 602 a communication connection between the user equipment and a first one of the multiple networks. The method further includes establishing 604 a communication connection between the user equipment and a second one of the multiple networks, while maintaining the communication connection between the user equipment and the first one of the multiple networks. A shared common control element in the user equipment manages 606 the flow of information between the user equipment and each of the multiple networks via the respective communication connections, thereby allowing for parallel user equipment activity in at least the first one and the second one of the multiple networks.

In some instances, the parallel user equipment activity can include one or more of receiving and responding to paging; performing mobility registration or tracking area update in each radio access technology; or actively use the communication connections established on both the first one and the second one of the multiple networks. In some of these instances, the communication connections being actively used on both the first one and the second one of the multiple networks can include packet data connections or packet data sessions.

In some instances, the shared common control element can include a multilayer non access stratum having respective lower non access stratum associated with a corresponding one of each of the multiple networks, and can have an upper common layer non access stratum which coordinates the parallel user equipment activity across the multiple networks. Additionally, the method can further include exchanging radio communication capabilities with one or more core network nodes associated with the multiple networks of the radio communication system, and receiving from the upper common layer non access stratum an indication as to whether one or both of the lower non access stratums associated with each of the multiple networks should be used for supporting concurrent access to the multiple networks. In some of these instances, as part of exchanging radio communication capabilities with the one or more core network nodes, when one or more of the one or more core network nodes indicates to the user equipment that a dual registration mode is not supported, then the user equipment can refrain from initiating procedures for dual registration. In some of these and/or other instances, as part of exchanging radio communication capabilities with the one or more core network nodes, when one or more of the one or more core network nodes indicates to the user equipment that a dual registration mode is supported, but also indicates a lack of support for using multiple types of radio access technology as part of the dual registration mode, then the user equipment can initiate procedures for dual registration, while keeping all of the communication connections being established via one of the multiple networks. Further yet, as part of exchanging radio communication capabilities with the one or more core network nodes, when each of the one or more core network nodes indicates to the user equipment support for multiple radio access technologies, even if the user equipment is limited to being single radio capable, then the upper layer non access stratum can make the determination as to whether to proceed with dual registration and parallel user equipment activity in at least the first one and the second one of the multiple networks. In support of dual registration and parallel user equipment activity in at least the first one and the second one of the multiple networks, when the user equipment is limited to being single radio capable, the method in the user equipment can further include one or more of (1) requesting a release of a radio resource control connection associated with the communication connection between the user equipment and the first one of the multiple networks, in order to establish the communication connection between the user equipment and the second one of the multiple networks; (2) autonomously transitioning to a radio resource control idle associated with the communication connection between the user equipment and the first one of the multiple networks, in order to establish the communication connection between the user equipment and the second one of the multiple networks; or (3) requesting a transition to an inactive state of the radio resource control connection associated with the communication connection between the user equipment and the first one of the multiple networks, in order to establish the communication connection between the user equipment and the second one of the multiple networks.

In some instances, the shared common control element can include one or more away patterns, that are each shared with a respective one of the first one and the second one of the multiple networks, where each of the one or more away patterns define periods of time during which the corresponding one of the first one and the second one of the multiple networks should avoid scheduling communications with the user equipment. In some of these and/or other instances, the one or more away patterns can include defined time periods that take into account relative predetermined priorities of the flow of information being conveyed between the user equipment and each of the multiple networks via the respective communication connections. Furthermore, as the relative predetermined priority of the flow of information being conveyed between the user equipment and each of the multiple networks via the respective communication connections changes, the corresponding one or more away patterns can be adjusted. In some of these and/or other instances, each of the one or more away patterns can be determined by the user equipment based on one or more of (1) different time offsets; (2) different paging occasions; or (3) random access channel opportunities.

In some instances, managing the flow of information between the user equipment and each of the multiple networks via the respective communication connections by the shared common control element can include apportioning the capabilities of the user equipment between the established communication connections. In some of these and/or other instances, apportioning the capabilities of the user equipment between the established communication connections can include determining the amount of power to apply to each transmitter, which is associated with a respective one of the established communication connections. Furthermore, when the sum of the power to be applied to each of the transmitters during parallel user equipment activity exceeds a maximum allowed transmit power of the user equipment, the method can include determining and applying a power back off to be applied to at least one of the transmitters. Further still, a non-prioritized communication connection as part of the parallel user equipment activity can be determined, and the power back off can be applied to at least the transmitter associated with the non-prioritized communication connection. In some instances, apportioning the capabilities of the user equipment between the established communication connections can include apportioning one or more of the antenna ports, the transmission or reception buffers, or supported band combinations. In some further instances, the capabilities can be apportioned based on factors including one or more of data rate, data volume, data reliability or data urgency. Further yet, in some instances, the apportioned capabilities can be indicated to one or more of the established communication connections, when the user equipment transitions to a connected state relative to a particular communication connection, or as part of an attach request.

Figure 7:
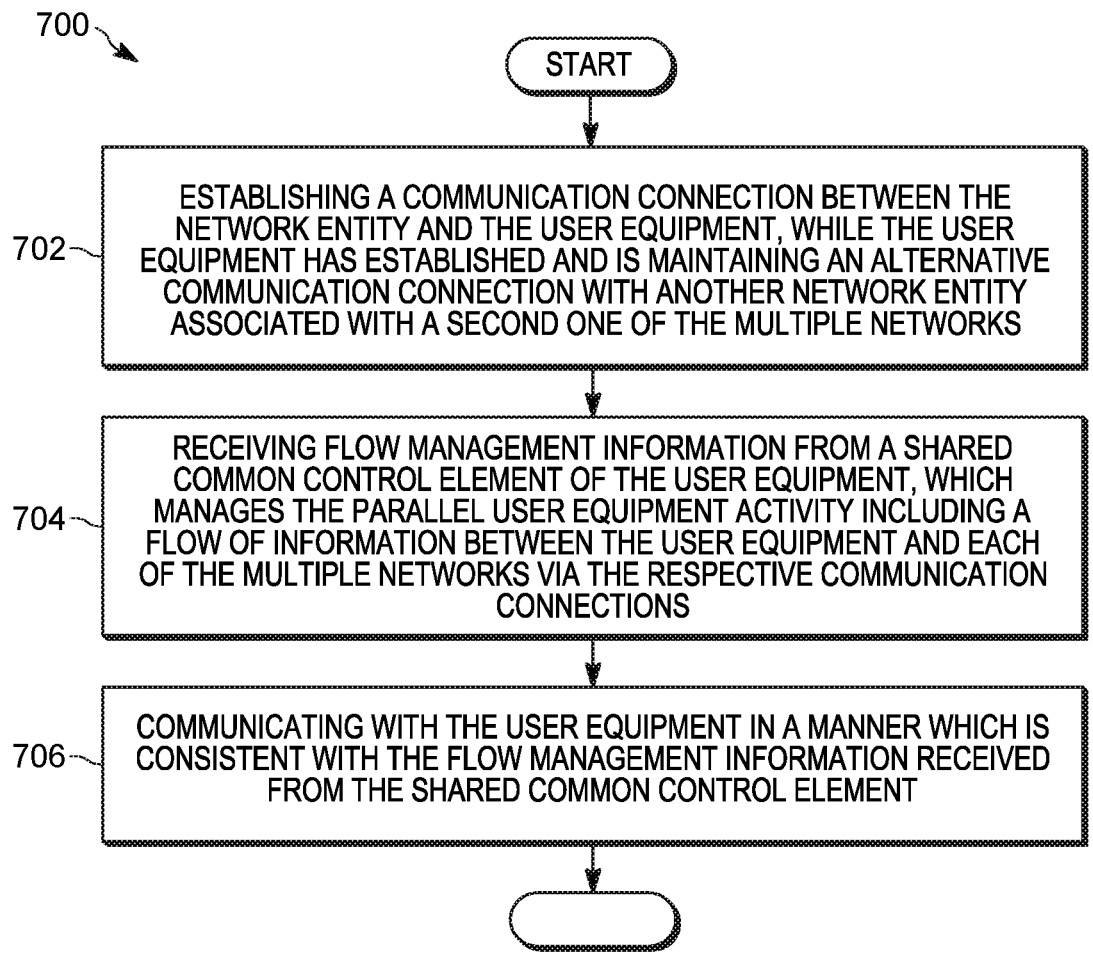
FIG. 7 is a flow diagram of a method in a network entity for managing a communication connection with a user equipment as part of a dual registration including multiple communication connections of the user equipment with multiple networks.

FIG. 7 illustrates a flow diagram 700 of a method in a network entity for managing a communication connection with a user equipment as part of a dual registration including multiple communication connections of the user equipment with multiple networks. More specifically, a method in a network entity of a first one of multiple networks is provided. Each network supports a different radio access technology. The method includes establishing 702 a communication connection between the network entity and the user equipment, while the user equipment has established and is maintaining an alternative communication connection with another network entity associated with a second one of the multiple networks. The method further includes receiving 704 flow management information from a shared common control element of the user equipment, which manages the parallel user equipment activity including a flow of information between the user equipment and each of the multiple networks via the respective communication connections. The method still further includes communicating 706 with the user equipment in a manner which is consistent with the flow management information received from the shared common control element.

Figure 8:
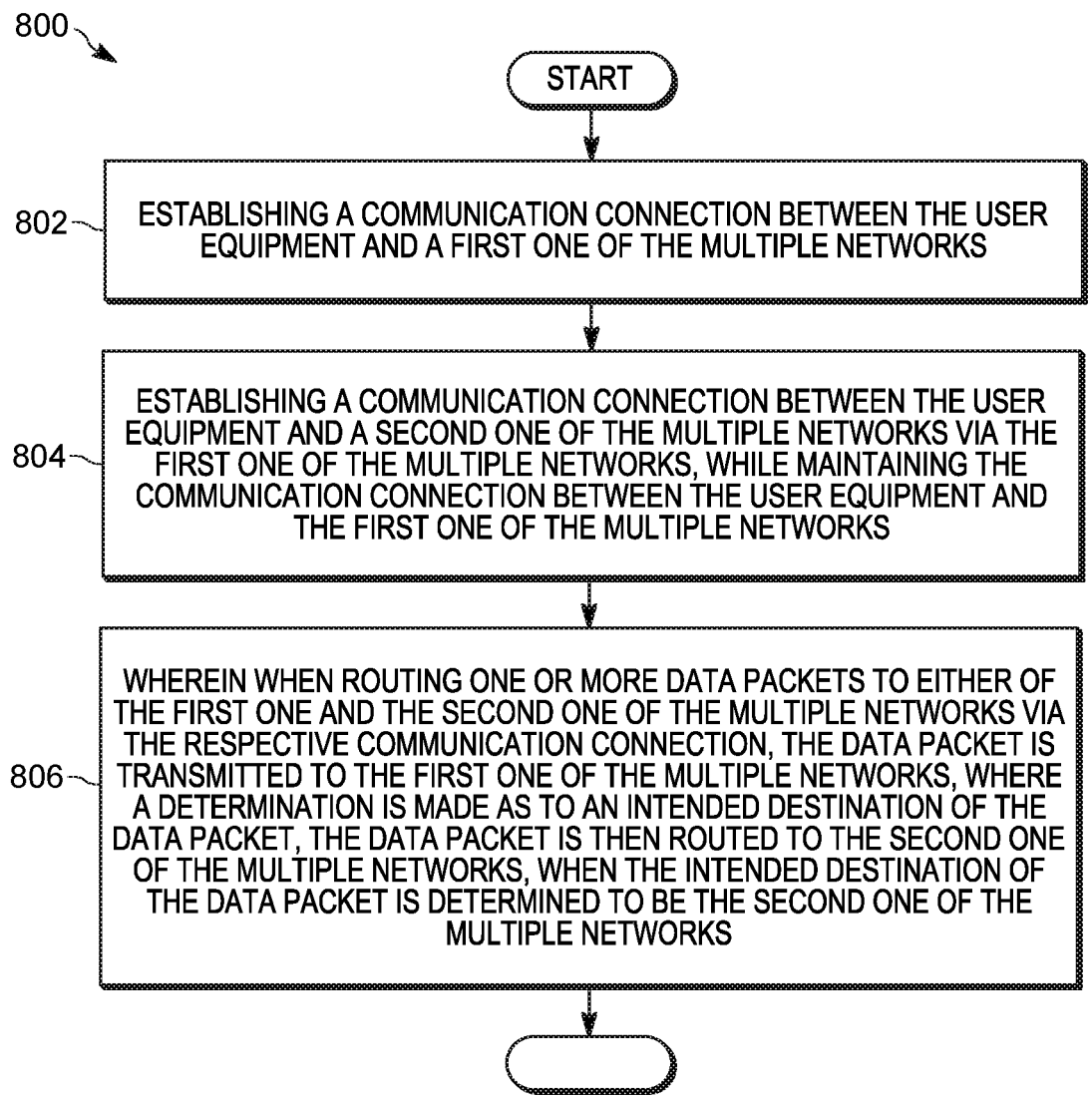
FIG. 8 is a flow diagram of a method in a user equipment for managing dual registration with multiple networks.

FIG. 8 illustrates a flow diagram 800 of a method in a user equipment for managing dual registration with multiple networks. More specifically, a method in a user equipment for managing dual registration in one or more radio communication systems is provided. The one or more radio communication systems include multiple networks, each of the multiple networks supporting a different radio access technology. The method includes establishing 802 a communication connection between the user equipment and a first one of the multiple networks. The method further includes establishing 804 a communication connection between the user equipment and a second one of the multiple networks via the first one of the multiple networks, while maintaining the communication connection between the user equipment and the first one of the multiple networks. When routing one or more data packets to either of the first one and the second one of the multiple networks via the respective communication connection, the data packet is transmitted 806 to the first one of the multiple networks, where a determination is made as to an intended destination of the data packet, the data packet is then routed to the second one of the multiple networks, when the intended destination of the data packet is determined to be the second one of the multiple networks.

In some instances, the user equipment can couple to the multiple networks via a base transceiver station associated with the first one of the multiple networks. In some of these instances, the base transceiver station can be coupled to a respective main signaling node of each of the first one and the second one of the multiple networks. Furthermore, the base transceiver station can be coupled to the main signaling node of the second one of the multiple networks via the main signaling node of the first one of the multiple networks. Still further, the base transceiver station can be coupled to each respective one of the first one and the second one of the multiple networks via a respective path of coupling, where the respective path of coupling is separate from the main signaling node of the other one of the first one and second one of the multiple networks. Further yet, the respective main signaling nodes of the first one and the second one of the multiple networks can include an access and mobility management function (AMF) and a mobility management entity (MME).

In some instances, an intended destination of a particular one of the one or more data packets can be determined by reading a registered identity value of a target entity from an associated one of the multiple networks, which is included as part of the data packet. In some of these instances, the registered identity value of a target entity can include an associated address value.

In some instances, a selectively set flag associated with a data packet can identify an intended destination as being one of the multiple networks.

In some instances, information included inside the data packet can be inspected to identify the intended destination. In some of these instances, the information can be included inside the data packet that is inspected includes one or more of a core network type address, user equipment address, or protocol message.

In some instances, a data radio bearer for each of the multiple networks can be maintained in parallel.

In some instances, using the communication connection of a particular one of the multiple networks can include using security keys and algorithms of the particular one of the multiple network being used.

Figure 9:
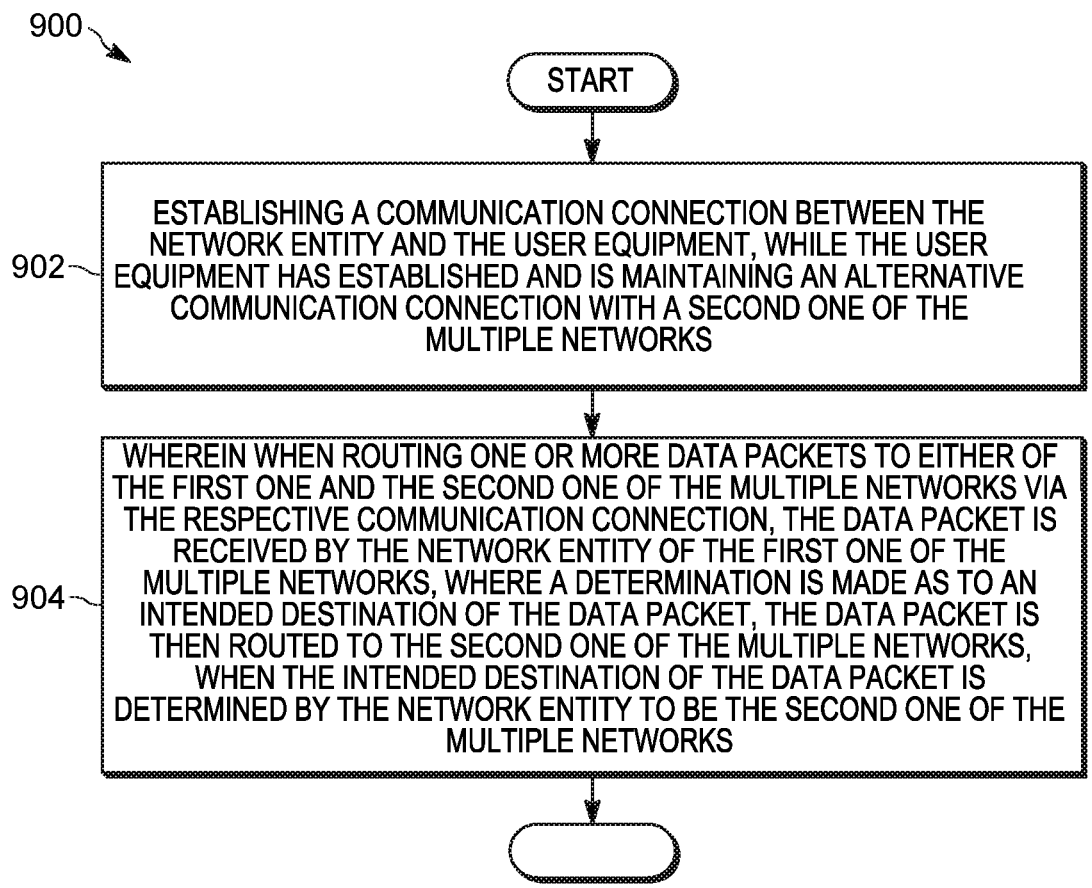
FIG. 9 is a flow diagram of a method in a network entity for supporting the routing of messages received from a user equipment between multiple networks as part of a dual registration.

FIG. 9 illustrates a flow diagram 900 of a method in a network entity for supporting the routing of messages received from a user equipment between multiple networks as part of a dual registration. More specifically, a method in a network entity of a first one of multiple networks is provided. Each network of the multiple networks supports a different radio access technology. The method includes establishing 902 a communication connection between the network entity and the user equipment, while the user equipment has established and is maintaining an alternative communication connection with a second one of the multiple networks. Wherein when routing one or more data packets to either of the first one and the second one of the multiple networks, the data packet is received 904 by the network entity of the first one of the multiple networks, where a determination is made as to an intended destination of the data packet. The data packet is then routed to the second one of the multiple networks, when the intended destination of the data packet is determined by the network entity to be the second one of the multiple networks.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 10:
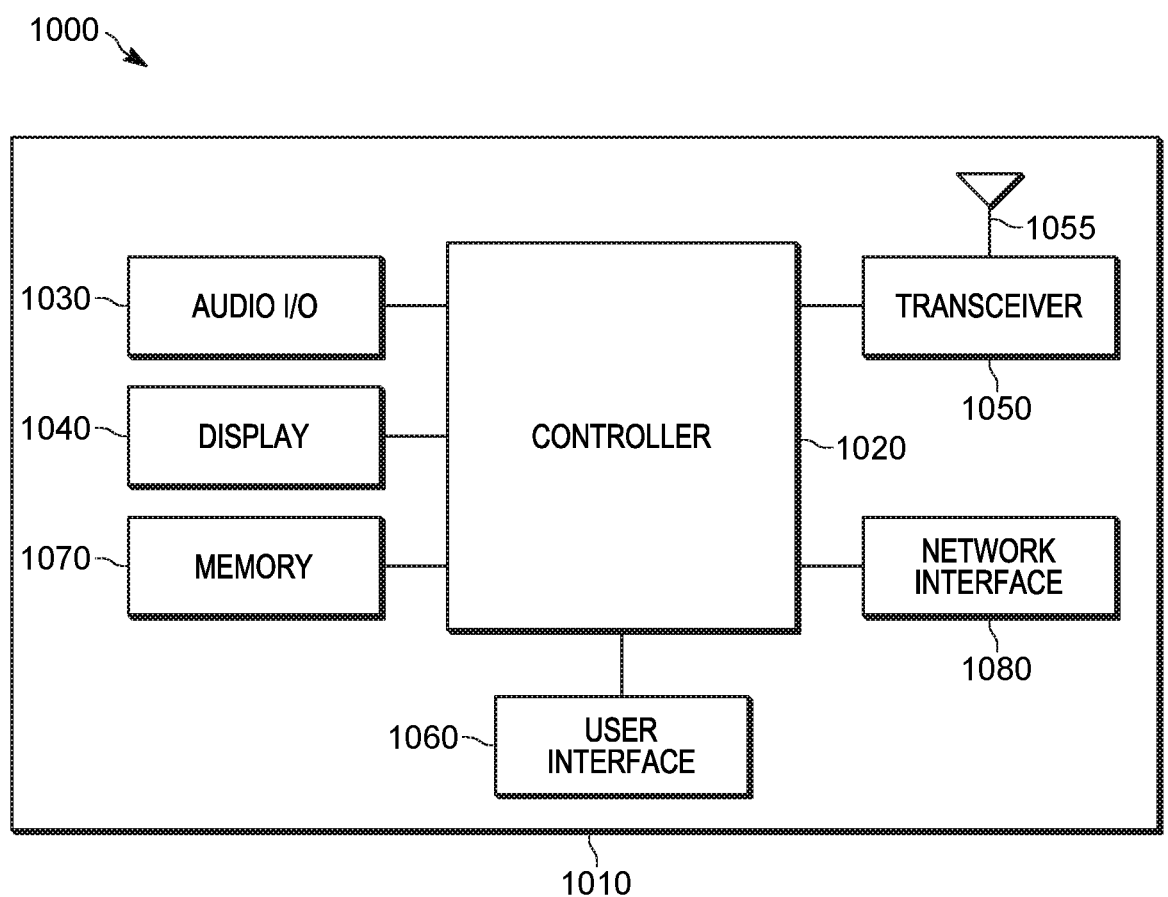
FIG. 10 is an example block diagram of an apparatus according to a possible embodiment.

FIG. 10 is an example block diagram of an apparatus 1000, such as the wireless communication device 110, according to a possible embodiment. The apparatus 1000 can include a housing 1010, a controller 1020 within the housing 1010, audio input and output circuitry 1030 coupled to the controller 1020, a display 1040 coupled to the controller 1020, a transceiver 1050 coupled to the controller 1020, an antenna 1055 coupled to the transceiver 1050, a user interface 1060 coupled to the controller 1020, a memory 1070 coupled to the controller 1020, and a network interface 1080 coupled to the controller 1020. The apparatus 1000 can perform the methods described in all the embodiments The display 1040 can be a viewfinder, a liquid crystal display (LCD), a light emitting diode (LED) display, a plasma display, a projection display, a touch screen, or any other device that displays information. The transceiver 1050 can include a transmitter and/or a receiver. The audio input and output circuitry 1030 can include a microphone, a speaker, a transducer, or any other audio input and output circuitry. The user interface 1060 can include a keypad, a keyboard, buttons, a touch pad, a joystick, a touch screen display, another additional display, or any other device useful for providing an interface between a user and an electronic device. The network interface 1080 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1070 can include a random access memory, a read only memory, an optical memory, a solid state memory, a flash memory, a removable memory, a hard drive, a cache, or any other memory that can be coupled to an apparatus.

The apparatus 1000 or the controller 1020 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1070 or elsewhere on the apparatus 1000. The apparatus 1000 or the controller 1020 may also use hardware to implement disclosed operations. For example, the controller 1020 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1020 may be any controller or processor device or devices capable of operating an apparatus and implementing the disclosed embodiments. Some or all of the additional elements of the apparatus 1000 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment for managing dual registration in one or more radio communication systems, the one or more radio communication systems including multiple networks each supporting a different radio access technology, the method comprising:

establishing a communication connection between the user equipment and a first one of the multiple networks; and establishing a communication connection between the user equipment and a second one of the multiple networks, while maintaining the communication connection between the user equipment and the first one of the multiple networks;

wherein a shared common control element in the user equipment manages the flow of information between the user equipment and each of the multiple networks via the respective communication connections, thereby allowing for parallel user equipment activity in at least the first one and the second one of the multiple networks; and wherein the shared common control element includes one or more away patterns, that are each shared with a respective one of the first one and the second one of the multiple networks, where each of the one or more away patterns define periods of time during which the corresponding one of the first one and the second one of the multiple networks should avoid scheduling communications with the user equipment.

2. A method in accordance with claim 1, wherein the parallel user equipment activity includes one or more of receiving and responding to paging; performing mobility registration or tracking area update in each radio access technology; or actively use the communication connections established on both the first one and the second one of the multiple networks.

3. A method in accordance with claim 2, wherein the communication connections being actively used on both the first one and the second one of the multiple networks include packet data connections or packet data sessions.

4. A method in accordance with claim 1, wherein the shared common control element includes a multilayer non access stratum having respective lower non access stratum associated with a corresponding one of each of the multiple networks, and having an upper common layer non access stratum which coordinates the parallel user equipment activity across the multiple networks; the method further comprising:

exchanging radio communication capabilities with one or more core network nodes associated with the multiple networks of the radio communication system;

receiving from the upper common layer non access stratum an indication as to whether one or both of the lower non access stratums associated with each of the multiple networks should be used for supporting concurrent access to the multiple networks.

5. A method in accordance with claim 4, wherein as part of exchanging radio communication capabilities with the one or more core network nodes, when one or more of the one or more core network nodes indicates to the user equipment that a dual registration mode is not supported, then the user equipment refrains from initiating procedures for dual registration.

6. A method in accordance with claim 4, wherein as part of exchanging radio communication capabilities with the one or more core network nodes, when one or more of the one or more core network nodes indicates to the user equipment that a dual registration mode is supported, but also indicates a lack of support for using multiple types of radio access technology as part of the dual registration mode, then the user equipment initiates procedures for dual registration, while keeping all of the communication connections being established via one of the multiple networks.

7. A method in accordance with claim 4, wherein as part of exchanging radio communication capabilities with the one or more core network nodes, when each of the one or more core network nodes indicates to the user equipment support for multiple radio access technologies, even if the user equipment is limited to being single radio capable, then the upper layer non access stratum can make the determination as to whether to proceed with dual registration and parallel user equipment activity in at least the first one and the second one of the multiple networks.

8. A method in accordance with claim 7, wherein in support of dual registration and parallel user equipment activity in at least the first one and the second one of the multiple networks, when the user equipment is limited to being single radio capable, the method in the user equipment further comprises one or more of (1) requesting a release of a radio resource control connection associated with the communication connection between the user equipment and the first one of the multiple networks, in order to establish the communication connection between the user equipment and the second one of the multiple networks; (2) autonomously transitioning to a radio resource control idle associated with the communication connection between the user equipment and the first one of the multiple networks, in order to establish the communication connection between the user equipment and the second one of the multiple networks; or (3) requesting a transition to an inactive state of the radio resource control connection associated with the communication connection between the user equipment and the first one of the multiple networks, in order to establish the communication connection between the user equipment and the second one of the multiple networks.

9. A method in accordance with claim 1, wherein the one or more away patterns include defined time periods that take into account relative predetermined priorities of the flow of information being conveyed between the user equipment and each of the multiple networks via the respective communication connections.

10. A method in accordance with claim 9, wherein as the relative predetermined priority of the flow of information being conveyed between the user equipment and each of the multiple networks via the respective communication connections changes, the corresponding one or more away patterns can be adjusted.

11. A method in accordance with claim 1 wherein each of the one or more away patterns are determined by the user equipment based on one or more of (1) different time offsets; (2) different paging occasions; or (3) random access channel opportunities.

12. A method in a user equipment for managing dual registration in one or more radio communication systems, the one or more radio communication systems including multiple networks each supporting a different radio access technology, the method comprising:

establishing a communication connection between the user equipment and a first one of the multiple networks; and establishing a communication connection between the user equipment and a second one of the multiple networks, while maintaining the communication connection between the user equipment and the first one of the multiple networks;

wherein a shared common control element in the user equipment manages the flow of information between the user equipment and each of the multiple networks via the respective communication connections, thereby allowing for parallel user equipment activity in at least the first one and the second one of the multiple networks;

wherein managing the flow of information between the user equipment and each of the multiple networks via the respective communication connections by the shared common control element includes apportioning the capabilities of the user equipment between the established communication connections;

wherein apportioning the capabilities of the user equipment between the established communication connections includes determining the amount of power to apply to each transmitter, which is associated with a respective one of the established communication connections; and wherein when the sum of the power to be applied to each of the transmitters during parallel user equipment activity exceeds a maximum allowed transmit power of the user equipment, the method includes determining and applying a power back off to be applied to at least one of the transmitters.

13. A method in accordance with claim 12, wherein a non-prioritized communication connection as part of the parallel user equipment activity is determined, and the power back off is applied to at least the transmitter associated with the non-prioritized communication connection.

14. A method in accordance with claim 12, wherein apportioning the capabilities of the user equipment between the established communication connections includes apportioning one or more of the antenna ports, the transmission or reception buffers, or supported band combinations.

15. A method in accordance with claim 12, wherein the capabilities are apportioned based on factors including one or more of data rate, data volume, data reliability or data urgency.

16. A method in accordance with claim 12, wherein the apportioned capabilities are indicated to one or more of the established communication connections, when the user equipment transitions to a connected state relative to a particular communication connection, or as part of an attach request.

17. A user equipment for managing dual registration in one or more radio communication systems, the one or more radio communication systems including multiple networks each supporting a different radio access technology, the user equipment comprising:
    a transceiver that establishes a communication connection between the user equipment and a first one of the multiple networks, and establishes a communication connection between the user equipment and a second one of the multiple networks, while maintaining the communication connection between the user equipment and the first one of the multiple networks; and
    a controller including a shared common control element that manages the flow of information between the user equipment and each of the multiple networks via the respective communication connections, thereby allowing for parallel user equipment activity in at least the first one and the second one of the multiple networks; and
    wherein the shared common control element of the controller includes one or more away patterns, that are each shared with a respective one of the first one and the second one of the multiple networks via the transceiver, where the one or more away patterns each define periods of time during which the corresponding one of the first one and the second one of the multiple networks should avoid scheduling communications with the user equipment.

18. A user equipment in accordance with claim 17, wherein the shared common control element of the controller includes a multilayer non access stratum having respective lower non access stratum associated with a corresponding one of each of the multiple networks, and having an upper common layer non access stratum which coordinates the parallel user equipment activity across the multiple networks; and
    wherein radio communication capabilities are exchanged between the multilayer non access stratum and one or more core network nodes associated with the multiple networks of the radio communication system, and the upper common layer non access stratum provides an indication as to whether one or both of the lower non access stratums associated with each of the multiple networks should be used for supporting concurrent access to the multiple networks.

19. A user equipment for managing dual registration in one or more radio communication systems, the one or more radio communication systems including multiple networks each supporting a different radio access technology, the user equipment comprising:
    a transceiver that establishes a communication connection between the user equipment and a first one of the multiple networks, and establishes a communication connection between the user equipment and a second one of the multiple networks, while maintaining the communication connection between the user equipment and the first one of the multiple networks; and
    a controller including a shared common control element that manages the flow of information between the user equipment and each of the multiple networks via the respective communication connections, thereby allowing for parallel user equipment activity in at least the first one and the second one of the multiple networks; and
    wherein the shared common control element of the controller includes capability apportioning control circuitry for use in support of user equipment supporting dual transmit capability, where the capability apportioning control circuitry determines the allocation of the available capabilities of the user equipment between each of the established communication connections;
    wherein the capability apportioning control circuitry determines the amount of power to apply to each transmitter, which is associated with a respective one of the established communication connections; and
    wherein when the sum of the power to be applied to each of the transmitters during parallel user equipment activity exceeds a maximum allowed transmit power of the user equipment, the capability apportioning control circuitry determines and applies a power back off to be applied to at least one of the transmitters.

* * * * *